United States Patent

Brown

[11] 4,049,849
[45] Sept. 20, 1977

[54] INHIBITING LEACHING OF FIRE RETARDANT SALTS FROM WOOD WITH CYCLIC SULFONIUM ZWITTERION SOLUTION IMPREGNANT

[75] Inventor: Frederick L. Brown, Midland, Mich.

[73] Assignee: The Dow Chemical Company, Midland, Mich.

[21] Appl. No.: 676,764

[22] Filed: Apr. 14, 1976

[51] Int. Cl.$^2$ .............................................. B05D 3/12
[52] U.S. Cl. .................................... 427/325; 427/397; 427/408; 427/326; 428/541; 428/537; 260/332.3 R; 106/15 FP; 252/8.1
[58] Field of Search .............. 427/408, 397, 325, 326; 260/332.3 R, 47 R; 428/541, 920, 274, 537; 106/15 FP

[56] References Cited

U.S. PATENT DOCUMENTS

| | | | |
|---|---|---|---|
| 2,763,579 | 9/1956 | Schulenberg | 428/541 |
| 2,917,408 | 12/1959 | Goldstein et al. | 428/541 |
| 3,565,679 | 2/1971 | Strother, Jr. | 428/276 |
| 3,749,737 | 7/1973 | Hatch | 260/332.3 R |
| 3,862,079 | 1/1975 | Pluedoemann | 260/332.3 R |
| 3,900,619 | 8/1975 | Lalk et al. | 427/408 |

Primary Examiner—P. C. Ives
Attorney, Agent, or Firm—G. R. Plotecher

[57] ABSTRACT

Leaching of a fire retardant salt, such as a mixture of ammonium phosphates, impregnated into a wood substrate is inhibited by a process comprising:
 a. impregnating the wood substrate with an aqueous solution of a cyclic sulfonium zwitterion (CSZ), exemplified by structural formula (I), and
 b. curing the resulting CSZ-impregnated wood substrate.

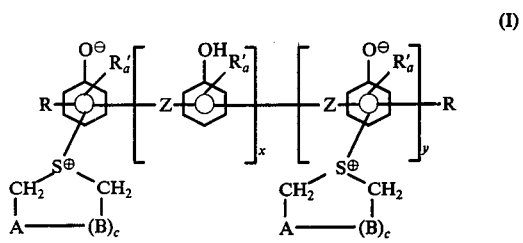

CSZ impregnation of the wood substrate can be either concurrent with or subsequent to the fire retardant salt impregnation of same. This process provides a significant degree of leach protection to otherwise very leachable fire retardant salts.

10 Claims, No Drawings

INHIBITING LEACHING OF FIRE RETARDANT SALTS FROM WOOD WITH CYCLIC SULFONIUM ZWITTERION SOLUTION IMPREGNANT

BACKGROUND OF THE INVENTION

Impregnating a wood substrate with a fire retardant salt (or "salt") to obtain a fire-retarded wood substrate is known art. However, due to the water solubility and hygroscopicity of most known fire retardant salts, the utility of such a fire-retarded wood substrate is generally restricted to low (less than 50 percent) humidity applications. For example, if an ammonium phosphate-impregnated wood substrate is exposed to high (greater than 90 percent) humidity at ambient temperature, in approximately 3 days the fire retardant impregnant (salt) will leach therefrom. In other words, the salt will absorb sufficient water vapor to enable it to migrate to the wood substrate surface. Not only does this leaching deplete the salt content of the wood substrate, rendering it less fire resistant, but it also severely disfigures the wood substrate's surface, especially if finished. This leaching process is accelerated if the ammonium phosphate-impregnated wood substrate is exposed to running water, such as rainfall upon exterior woodwork.

Strother U.S. Pat. No. 3,565,679 teaches a composition comprising a cellulosic substrate impregnated with a polyalkylenepolyamine in combination with a condensation product of phosphorus pentoxide and ammonia. This composition demonstrates some leach resistance while utilizing the known fire retardant characteristics of ammonia and phosphorus. However, U.S. Pat. No. 3,565,679 compositions exposed to 95 percent relative humidity absorb sufficient water to cause some of the salt therein to migrate to the surface and thereat form small beads.

Lalk et al. U.S. Pat. No. 3,900,619 teach a process of inhibiting the staining of latex paint applied to a wood surface containing water-soluble tannin comprising applying to the wood substrate surface essentially the same water-soluble S-aryl cycloaliphatic sulfonium compounds here used. However, the Lalk et al. teaching confines its disclosure to the problem of tannin migration and surface treatments therefor, and does not address the dissimilar problem of inhibiting the leaching of a fire retardant salt from a wood substrate.

SUMMARY OF THE INVENTION

According to this invention, the leaching of a fire retardant salt from a wood substrate is significantly inhibited by a novel process comprising:

a. impregnating the wood substrate with either
  i. an aqueous solution comprising between about 5 and about 40 weight percent solids, the solids consisting of the fire retardant salt and a cyclic sulfonium zwitterion at a fire retardant salt:cyclic sulfonium zwitterion weight ratio between about 1:1 and about 20:1; or
  ii. subsequent to impregnating the wood substrate with the fire retardant salt, with an aqueous solution comprising between about 1 and about 40 weight percent of the cyclic sulfonium zwitterion; and
b. curing the resulting cyclic sulfonium zwitterion-impregnated wood substrate.

DETAILED DESCRIPTION OF THE INVENTION

The cyclic sulfonium zwitterions (CSZ) here used are of the formula:

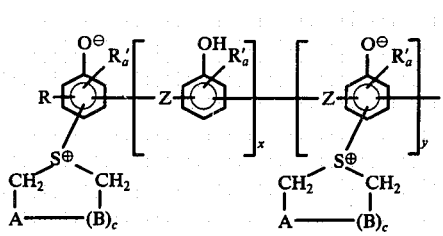

(I)

wherein
each R individually is H, Cl, Br, OH, or —OC$_1$—C$_4$ alkyl;
each R' individually is H, Cl, Br or C$_1$-C$_4$ alkyl and $a$ is 1 or 2;
each A and B individually are —CH$_2$— or —CHR'— and $c$ is 1 or 2; and
Z is an optional bridging group of the formula:
1. —O—, —S—, —O(C$_m$H$_{2m}$)O— where $m$ is 1-6, and $\Sigma(x+y) = 1$;
2. —CR$_2''$— where R'' is C$_1$-C$_4$ alkyl, and $\Sigma(x+y) = 1$;
3. —CH$_2$— and $\Sigma(x+y) = 1$-5; or
4.

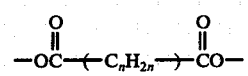

where $n$ is 0-6, and $\Sigma(x+y) = 1$.

Of course, where Z is absent, $\Sigma(x+y) = 0$. These CSZ are known in the art and are described in U.S. Pat. Nos. 3,636,052, 3,660,431, 3,749,737, 3,749,738 and 3,749,739 and in copending application Ser. No. 582,554 by Doorakian and Schmidt filed May 29, 1975, the disclosures of which are incorporated herein by reference.

The term "cyclic sulfonium zwitterion (CSZ)" is also intended to include ar-cyclic sulfonium, fused polynuclear areneoxides exemplified by the structural formula:

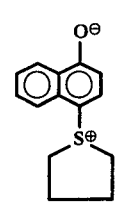

(II)

described by the copending application Ser. No. 664,791 by Broxterman, Urchick, Schmidt, and Hoornstra, filed Mar. 8, 1976, the disclosure of which is also herein incorporated by reference.

The term "wood substrate" as used herein is intended to encompass wood, wood composites and wood-derived products. Any wood substrate capable of impregnation by both a cyclic sulfonium zwitterion and a fire retardant salt can be used in the practice of this invention. Typical examples include: wood, such as southern and ponderosa pine (softwood species), and maple and oak (hardwood species); wood composites, such as particle and fiberboard, plywood, and reconstituted products; and wood-derived products, such as veneer and paper.

In practicing this invention, any suitable impregnating process can be used. Typically, the process of this invention involves the steps of impregnating the wood substrate with an aqueous solution of a cyclic sulfonium zwitterion and then curing the resulting CSZ-impregnated wood substrate. For example, one common impregnation method involves the steps of removing the impregnating chamber's atmosphere, impregnating, and then returning the impregnating chamber's atmosphere (or applying super-atmospheric pressure). Any suitable curing technique can be used.

By "impregnating" is meant the filling of the voids and/or cell units beneath the surface of the wood substrate with an impregnant, such as a cyclic sulfonium zwitterion, a fire retardant salt or a mixture thereof.

The concentration of the cyclic sulfonium zwitterion in the aqueous solution and the amount of aqueous solution used in the impregnating process can be varied widely depending on the type of wood to be treated and the degree of leach resistance desired. A minimum concentration of about 1 percent by weight is generally a sufficient amount to noticeably inhibit the leaching of the fire retardant salt from the wood substrate, although a minimum concentration of about 2 percent is preferred. Practical considerations, such as CSZ solubility and impregnation technique, and economic considerations are the only limitations upon the maximum concentration that can be used, and in deference thereto, the maximum concentration generally used is 40 percent by weight and preferably 20 percent by weight.

A preferred mode of practicing this invention is to formulate (mix) the fire retardant salt and cyclic sulfonium zwitterion into a single aqueous solution and impregnate the wood substrate with same. Thus, the wood substrate can be made both fire retardant and leach resistant in one step. Substantially any fire retardant salt or mixture of fire retardant salts that is capable of impregnating a wood substrate can be used. Illustrative salts include mono- and di-ammonium phosphates and mixtures thereof, ammonium sulfate, sodium tetraborate and the formulations thereof recognized by the American Wood Preservers Association in their standard P10-68.

In the practice of this invention's preferred mode, the aqueous salt-CSZ formulations are comprised of at least about 5 percent and preferably about 15 percent solids. The total maximum solids of such formulations are about 40 percent and preferably about 30 percent. The solids of such formulations consist of the fire retardant salt and the cyclic sulfonium zwitterion. A salt:CSZ weight ratio of at least about 20:1 can be used, but generally a minimum weight ratio of about 10:1 is preferred. Salt-CSZ weight ratios as high as 1:1 can be used but are disfavored due to economic considerations.

The following examples are illustrative of certain specific embodiments of the invention. Unless otherwise noted, all parts and percentages are by weight.

SPECIFIC EMBODIMENTS

Examples 1 and 2

Cyclic sulfonium zwitterions of the formulae:

(III)  (IV)

hereinafter respectively referred to as resorcinol S+ and novalac S+, were aqueously formulated with FIRE RETARDANT A®(abbreviated FR-A and described as a 40/60 mixture of mono-/di-ammonium phosphate manufactured by the Monsanto Company). The aqueous formulations were prepared at 1:1, 2:1, 4:1 and 6:1 weight ratios of FR-A solids:CSZ monomer solids. The aqueous formulations were tested at 15 percent and 30 percent solids.

Ponderosa pine sapwood specimens (½ inch × ½ inch × 3 inches) were impregnated with the various aqueous formulations by placing same in an impregnating chamber, evacuating said chamber to approximately 29.5 inches of mercury for 30 minutes, admitting the various aqueous formulations to cover the specimens (which were restrained from floating while maintaining vacuum), and then exposing the submerged specimens to atmospheric pressure (by returning the chamber's atmosphere). The submerged specimens were then held overnight to allow a period of diffusion. Specimens were subsequently cured for about 16 hours in an oven at 105° C, cooled over desiccant and weighed to determine oven-dry, cured weight.

Leach resistance was then determined by reimpregnating (per the above procedure) the cured specimens with water followed by overnight soaking. This procedure will remove 50 to 75 percent of FR-A from an FR-A impregnated wood substrate if it (FR-A) is used alone. The leached specimens were oven-dried a second time and then conditioned at 50 percent relative humidity to achieve a 7 percent ± 3 percent moisture content as required in the American Society for Testing and Materials' (ASTM) E160-50 crib test. The conditioned specimens were then burned according to said crib test. The data is set forth in Table I.

Example 3

An o-cresol cyclic sulfonium zwitterion of the formula:

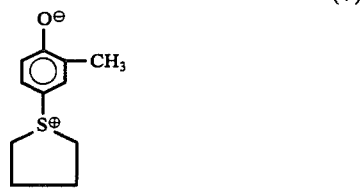

(V)

was similarly formulated with FR-A. Aqueous formulations were prepared at a 30 percent solids level with salt:CSZ weight ratios of 1:1 and 8:1. The impregnation and leaching procedures were the same as those in Examples 1 and 2 except a more rigorous leach procedure was here used; specimens were held submerged in water for 3 days rather than overnight. The specimens were subsequently oven-dried, conditioned at 50 percent relative humidity to 7 percent ± 3 percent moisture content and then burned per the ASTM E160-50 crib test. The results are presented in Table I.

Example 4

A bisphenol A cyclic sulfonium zwitterion of the formula:

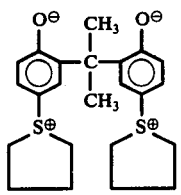

(VI)

was also similarly formulated with FR-A. Formulations were prepared at 30 percent and 15 percent solids levels with salt:CSZ weight ratios of 8:1, 4:1 and 1:1. The impregnation procedure of Examples 1 and 2 was followed except after overnight soaking at atmospheric pressure, the specimens were air-dried at laboratory conditions and then heat-treated in an oven, first for 4 hours at 50° C and then for 18 hours at 105° C.

The treated specimens were subsequently leached by the same impregnation procedures of Examples 1 and 2 except that the specimens were oven-dried at 105° C for 18 hours.

Again, the specimens were conditioned to 7 percent ± 3 percent moisture content as in Examples 1-3 prior to being burned per the ASTM E160-50 crib test. The results are presented in Table I.

ancy" and similar terms as used herein are intended to denote the characteristic of rendering wood substrates, in which "fire retarding" agents are incorporated, less readily combustible than such substrates would otherwise be when subjected to a small-scale ignition source.

As expected, the higher levels of CSZ monomer solids in the formulations correlate with the lower solids leach losses.

What is claimed is:

1. A process for inhibiting the leaching of a fire retardant salt from a wood substrate comprising:
   a. impregnating the wood substrate with either
      i. an aqueous solution comprising between about 5 and about 40 weight percent solids, the solids consisting of the fire retardant salt and a cyclic sulfonium zwitterion at a fire retardant salt:cyclic sulfonium zwitterion weight ratio between about 1:1 and about 20:1; or
      ii. subsequent to impregnating the wood substrate with the fire retardant salt, with an aqueous solution comprising between about 1 and about 40 weight percent of the cyclic sulfonium zwitterion; and
   b. curing the resulting cyclic sulfonium zwitterion-impregnated wood substrate.

2. The process of claim 1 wherein the aqueous solution of (a)(ii) comprises between about 2 and about 20 weight percent of the cyclic sulfonium zwitterion.

3. The process of claim 1 wherein the fire retardant salt:cyclic sulfonium zwitterion weight ratio is between about 1:1 and about 10:1.

4. The process of claim 1 wherein the aqueous solution of (a)(i) comprises between about 15 and about 30

TABLE I
PERTINENT TREATMENT AND BURN DATA FROM ASTM E160-50 CRIB TEST OF CYCLIC SULFONIUM ZWITTERION-FIRE RETARDANT SALT FORMULATIONS

| Example | Cyclic Sulfonium Zwitterion Monomer | Fire Retardant Salt | Weight Ratio Solids Salt/Monomer | Solids in Treating Solution % | Solids Retained at Treatment % | Solids Lost During Leaching % | Phosphorus Retained at Time of Burn % (1) | (2) | Weight Loss During Burn % |
|---|---|---|---|---|---|---|---|---|---|
| 1 | Resorcinol S⊕ | FR-A | 1/1 | 30 | 74.6(1) | 6.65 | 9.33 | 5.35 | 16.9 |
|   |   |   |   | 15 | 34.0 | 7.16 | 4.25 | 3.11 | 19.4 |
|   |   |   | 2/1 | 30 | 72.9 | 11.0 | 12.2 | 6.55 | 14.4 |
|   |   |   |   | 15 | 33.4 | 15.4 | 5.60 | 3.49 | 26.6 |
|   |   |   | 4/1 | 30 | 71.6 | 14.6 | 14.3 | 7.47 | 13.8 |
|   |   |   |   | 15 | 34.1 | 23.2 | 6.82 | 3.85 | 24.8 |
| 2 | Novalac S⊕ | FR-A | 1/1 | 30 | 71.3 | 14.8 | 7.66 | 5.84 | 17.0 |
|   |   |   |   | 15 | 33.2 | 6.8 | 3.52 | 3.54 | 36.6 |
|   |   |   | 6/1 | 30 | 70.3 | 16.6 | 12.7 | 8.41 | 12.8 |
|   |   |   |   | 15 | 33.8 | 26.0 | 6.24 | 4.48 | 25.7 |
| 3 | o-Cresol S⊕ | FR-A | 1/1 | 30 | 61.9 | 28.0(3) | 5.17 | 3.65 | 60.3 |
|   |   |   | 8/1 | 30 | 64.0 | 53.0(3) | 6.49 | 5.02 | 18.4 |
| 4 | Bisphenol A S⊕ | FR-A | 1/1 | 30 | 58.4 | 9.7 | 6.6 | — | 25.4 |
|   |   |   |   | 15 | 28.0 | 11.6 | 3.1 | — | 35.3 |
|   |   |   | 4/1 | 30 | 55.8 | 33.5 | 7.4 | — | 15.1 |
|   |   |   |   | 15 | 27.4 | 25.3 | 4.1 | — | 28.1 |
|   |   |   | 8/1 | 30 | 54.6 | 32.1 | 8.2 | — | 15.2 |
|   |   |   |   | 15 | 27.3 | 7.8 | 5.6 | — | 24.8 |

(1)Based upon oven-dry, untreated weight.
(2)Based upon oven-dry, treated, leached weight.
(3)Three days of leach.

As stated earlir, a wood substrate impregnated only with FR-A looses between 50 and 75 percent of the FR-A during the leach process described in the above examples. The above tabulated data demonstrates the significant leach protection afforded the FR-A impregnated wood substrate by this invention. Of particular note is the data in the Weight Loss During Burn column which demonstrates that, notwithstanding leach exposure, the CSZ-impregnated, fire retarded wood substrate maintains substantial fire retardance. (Weight losses less than 30 percent are indicative of substantial fire retardant protection.) "Fire retardant", "fire retardweight percent solids.

5. The process of claim 4 wherein the fire retardant salt:cyclic sulfonium zwitterion weight ratio is between about 1:1 and about 10:1.

6. The process of claim 5 wherein the cyclic sulfonium zwitterion is of the formula 7. The process of claim 5 wherein the cyclic sulfonium zwitterion is of the formula
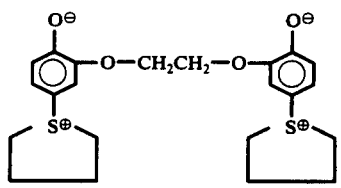
8. The process of claim 5 wherein the cyclic sulfonium zwitterion is of the formula
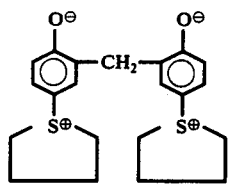
9. The process of claim 5 wherein the cyclic sulfonium zwitterion is of the formula
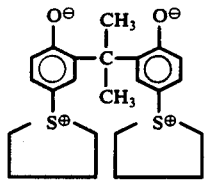
10. The process of claim 5 wherein the fire retardant salt is a mixture of ammonium phosphates.
* * * * *